US009706284B2

United States Patent
Lott

(10) Patent No.: US 9,706,284 B2
(45) Date of Patent: Jul. 11, 2017

(54) INTELLIGENT HEADPHONE

(71) Applicant: Aurisonics, Inc., Nashville, TN (US)

(72) Inventor: Phillip Dale Lott, Nashville, TN (US)

(73) Assignee: Fender Musical Instruments Corporation, Scottsdale, AZ (US)

( * ) Notice: Subject to any disclaimer, the term of this patent is extended or adjusted under 35 U.S.C. 154(b) by 21 days.

(21) Appl. No.: 14/721,690

(22) Filed: May 26, 2015

(65) Prior Publication Data

US 2016/0353195 A1    Dec. 1, 2016

(51) Int. Cl.
*H04R 1/10*     (2006.01)
*H04R 27/00*    (2006.01)

(52) U.S. Cl.
CPC ......... *H04R 1/1041* (2013.01); *H04R 1/1083* (2013.01); *H04R 27/00* (2013.01); *H04R 2227/003* (2013.01); *H04R 2420/07* (2013.01); *H04R 2460/01* (2013.01)

(58) Field of Classification Search
None
See application file for complete search history.

(56) References Cited

U.S. PATENT DOCUMENTS

| | | |
|---|---|---|
| 6,208,740 B1 | 3/2001 | Grever |
| 7,873,177 B2 | 1/2011 | Okamura et al. |
| 7,916,888 B2 | 3/2011 | Sapiejewski et al. |
| 7,920,903 B2 | 4/2011 | Ueda et al. |
| 8,213,645 B2 | 7/2012 | Rye et al. |
| 8,498,428 B2 | 7/2013 | Schreuder et al. |
| 8,515,115 B2 | 8/2013 | Kelly et al. |
| 8,897,463 B2 | 11/2014 | Harvey |
| 8,976,987 B2 | 3/2015 | Ozawa et al. |
| 2006/0193479 A1 | 8/2006 | Harvey et al. |
| 2012/0123573 A1* | 5/2012 | Goldstein ............ H04R 1/1091 700/94 |
| 2013/0243236 A1 | 9/2013 | Chamness et al. |
| 2014/0233754 A1 | 8/2014 | Chae et al. |
| 2014/0270231 A1* | 9/2014 | Dusan ..................... G10L 25/90 381/74 |

\* cited by examiner

*Primary Examiner* — Muhammad N Edun
(74) *Attorney, Agent, or Firm* — Hall Estill Attorneys at Law; Tyler J. Mantooth

(57) ABSTRACT

An intelligent headphone may be configured at least with a headphone having a shape, size, and material to engage an ear of a user. The headphone may have at least a controller, accelerometer, and audio processor. The headphone accelerometer can be positioned to allow speech of the user to be sensed.

20 Claims, 4 Drawing Sheets

US 9,706,284 B2

INTELLIGENT HEADPHONE

RELATED APPLICATION

The present application makes a claim of domestic priority to U.S. Provisional Patent Application No. 62/002,467 filed May 23, 2014, the contents of which are hereby incorporated by reference.

SUMMARY

Various embodiments may configure an intelligent headphone with at least a headphone arranged to engage an ear of a user. The headphone may have at least a controller, accelerometer, and audio processor with the headphone accelerometer positioned to allow speech of the user to be sensed.

DETAILED DESCRIPTION

Advancements in the size and computing power of integrated circuits and semiconductors have allowed mobile electronic devices to employ more profound capabilities. For example, a computer processor and memory can have a form factor capable of fitting within housings smaller than a half-dollar. Such miniscule sizing can allow electronic devices that have previously been too small to employ computing components to be equipped with hardware capable of making the devices intelligent. However, the implementation of hardware is inefficient if the device is not executing software optimizing the use of such hardware. Hence, there is a continued industry and consumer demand for integration of reduced form factor computing hardware as well as software that optimizes the use of the hardware.

With these issues and demand in mind, various embodiments configure an intelligent headphone with at least a headphone arranged to engage an ear of a user and have have a controller, accelerometer, and audio processor with the headphone accelerometer positioned to allow speech of the user to be sensed. The combination of hardware sized and positioned in a headphone along with the ability to sense speech with the hardware allows the headphone to intelligently interact with a user. The ability to sense speech with a controller and audio processor portions of the headphone can further allow for processing of sensed signals to enhance the user's listening experience involving recorded and live sounds produced internally and externally with respect to the headphone.

Figure 1:
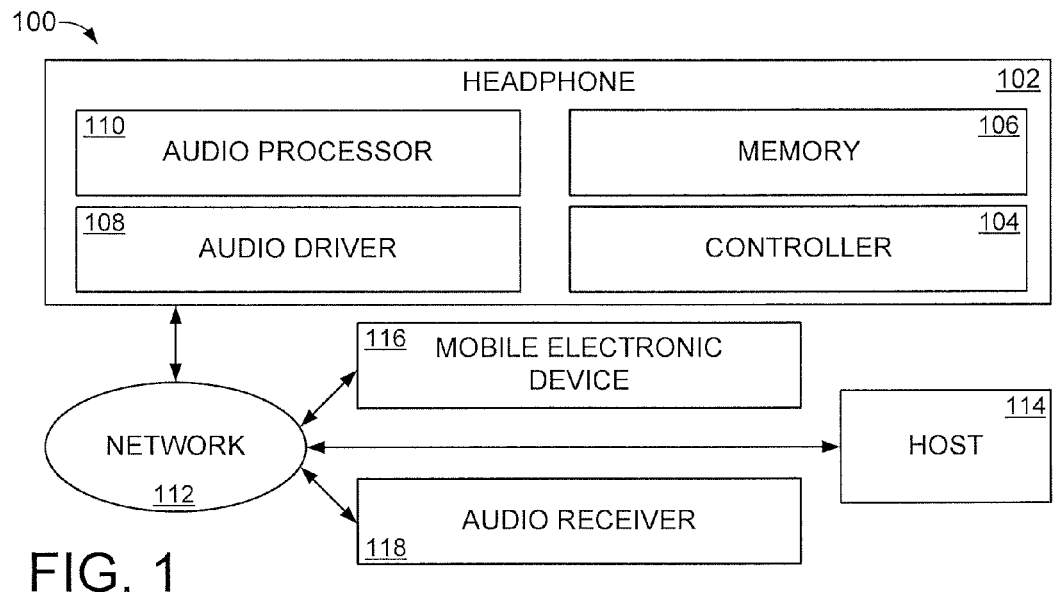
FIG. 1 is a block representation of an example portion of a headphone system configured and operated in accordance with some embodiments.

Although a mobile computing system can employ computing hardware in an unlimited variety of environments and systems, various embodiments configure a mobile computing system as the example headphone system 100 displayed as a block representation in FIG. 1. It should be noted that the various aspects of the headphone system 100 are not required or limiting, but can be arranged as shown. As such, the headphone system 100 can have one or more headphones 102 that can be similarly or dissimilarly constructed with a controller 104, memory 106, audio driver 108, and audio processor 110. It is contemplated that the headphone 102 houses at least one controller 104, memory 106, audio driver 108, and audio processor 110 while being capable of connecting to remote ports via a wired or wireless network 112.

The controller 104 of the headphone 102 may be a microprocessor or application specific integrated circuit (ASIC) that connects to, and directs activity of, the memory 106, audio driver 108, and audio processor 110. The memory 106 may be one or more types, sizes, and arrays of data storage that allow for temporary and permanent storage of software, user created data, data management data, operating systems, and executable applications. For instance, the memory 106 may be configured with a fast volatile cache memory, such as dynamic random access memory (DRAM), and a slower non-volatile main memory, such as NAND, flash, or other solid-state memory.

The audio driver 108 may be tuned to incorporate one or more audio reproducing means, such as a micro-dynamic speaker, that may or may not receive signals amplified from within the headphone 102. Audio signals reproduced by the audio driver 108 can first be altered by one or more audio processors, such as a digital-to-analog (D/A) converter, filters, and audio compression modules. The use of one or more audio processors can artificially change sound signals received from a sound source, such as a music recording or live human voice, to provide varying detail, bass, loudness, presence, and clarity in sounds produced by the audio driver 108.

The headphone 102 may communicate with, have access to, and be controlled by one or more remote sources via the network 112. While not required or limiting, the headphone 102 can be remotely connected to a host 114, such as a server node, a mobile electronic device, such as a computer, phone, and music player, and an audio receiver 118, such as a wireless transponder. The ability to remotely connect with one or more sources can allow the various aspects of the headphone 102 to be utilized individually and concurrently to optimize the capabilities of the headphone 102. As a non-limiting example, the remote host 114 may receive requested data from the headphone 102 while the audio receiver 118 is sending sound signals to the headphone 102 that are processed by audio processor 110 and subsequently delivered to the user by the audio driver 108.

Figure 2:
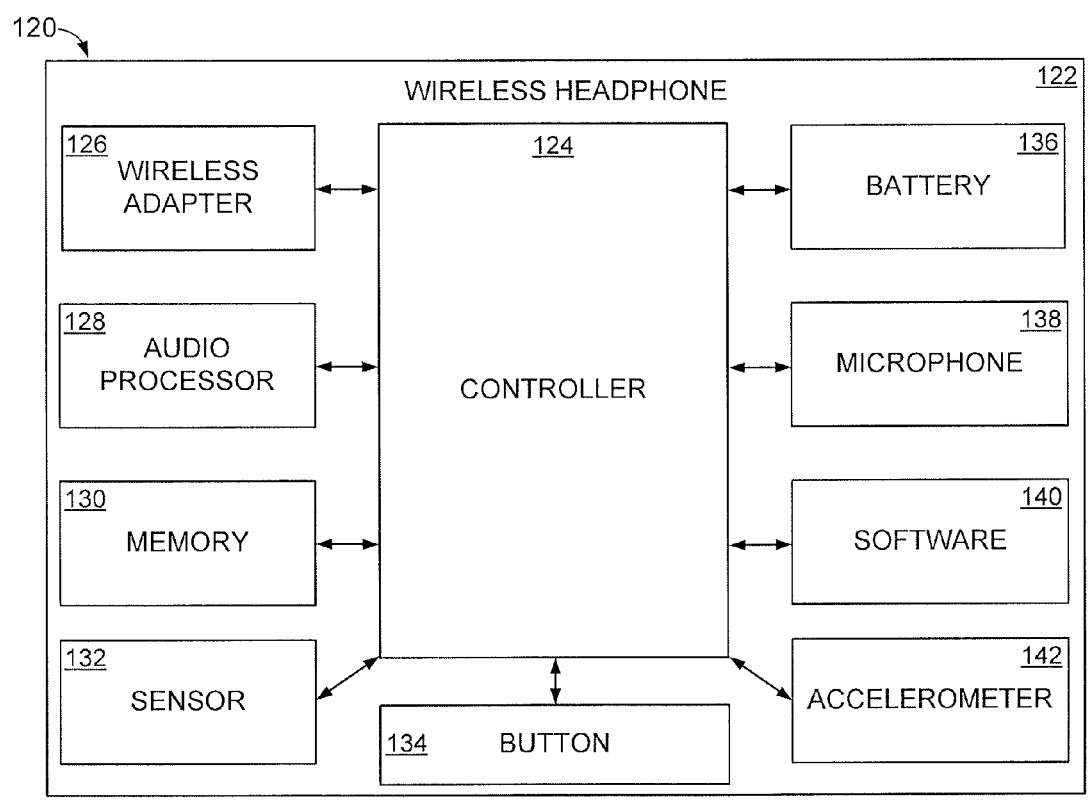
FIG. 2 shows a block representation of a portion of an example headphone system arranged in accordance with various embodiments.

The ability of the headphone 102 to remotely connect to various external sources can allow the headphone 102 to be wireless without losing capabilities or performance afforded to wired headphones, such as music and data sources. FIG. 2 illustrates a block representation of a portion of an example headphone system 120 that may be constructed and operated as part of the headphone system 100 of FIG. 1 in accordance with some embodiments. Although not required, the headphone system 120 has at least one wireless headphone 122 that is not tethered to an audio or data source external to the housing of the headphone 120.

The wireless headphone 120 is configured with one or more controllers 124 that can connect to, communicate with, activate, and deactivate a plurality of different electrical components. The controller 124 can be connected to a wireless adapter 126, such as an encrypted or secure network like a Bluetooth connection. The wireless adapter 126 can allow multiple different wireless pathways to be established, maintained, and terminated to provide data, sound, and control signals from external sources. Received signals may pass through an audio processor 128 and memory 130 in any order to allow the retention, playback, and transmittal of signals back to the external source as well as the audio driver that can reproduce sounds to the user.

The controller 124 may further be connected to one or more sensors 132 that can detect and measure environmental, processing, power, and user biometrics. For example, tactile, capacitive, and gesture-based engaging of at least one button 134 by the user in a predetermined pattern can act as a code that enables, disables, or unlocks capabilities of the wireless headphone 122. A sensor 132 may also allow the wireless headphone 122 to detect when a user has disengaged the headphone 122 from their ear, which allows power management and security protocol to efficiently manage the capabilities of the headphone 122. The controller 124 may execute a power management scheme to conserve, regenerate, and identify the status of a battery 136, such as a Lithium Ion power source or any type of power source.

The wireless headphone 122 can be equipped with one or more microphones 138 to capture and monitor sounds about the headphone 122. In some embodiments, the wireless headphone 122 has internal and external microphones that can selectively, individually, and collectively detect audible and inaudible data from proximal a user's ear as well as in the surroundings, distal the user's ear. The ability to employ internal and external microphones can allow the controller 124 to identify the status of the user's listening experience and respond by producing, reproducing, and altering sound signals to enhance the user's listening experience. It is noted that the capability of the controller 124 to collect, process, and reproduce data and sound signals can be directed by one or more software 140 programs, applications, and routines. Such software 140 may be resident in the memory 130 and streamed from a remote third-party, without limitation.

One or more accelerometers 142 can be incorporated into the wireless headphone 122 to provide an array of capabilities. For instance, the controller 124, as directed by software 140, can learn, log, and recognize if and how a user is talking, gesturing, and sleeping. That is, the accelerometer 142 can be initially programmed or learn through the logging of user activity the manner in which a user biomechanically moves when talking, gesturing, and sleeping. The detection of vibration, movement intensity, and movement speed can be unique to a user due to the dental, skeletal, and muscular configuration of the user. That is, an accelerometer 142, perhaps in combination with one or more sensors 132, can sense vibration and movement of the user's jaw, teeth, skull, ear canal, and external ear structure to identify whether or not the user is talking, what the user is saying, what gestures the user is using, the psychological state of the user, and the quality of the user's sleep.

Figure 3:
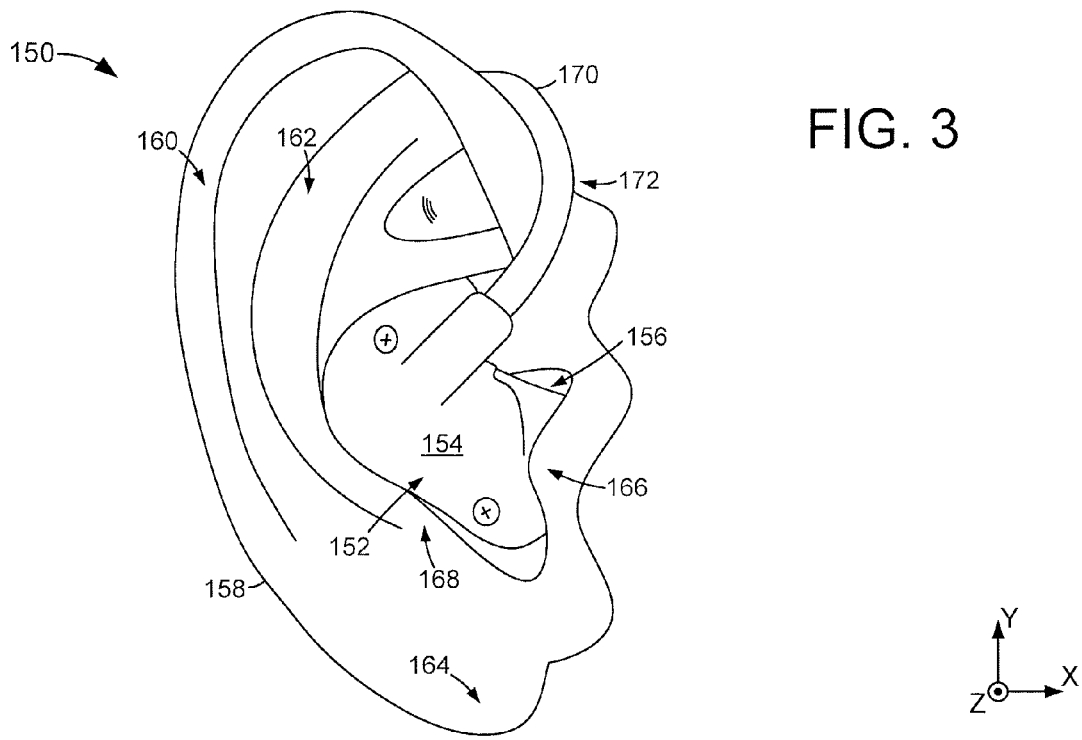
FIG. 3 displays a perspective block representation of a portion of an example intelligent headphone system configured in accordance with various embodiments.

FIG. 3 depicts a perspective view of a portion of an example headphone system 150 configured in accordance with assorted embodiments. The headphone system 150 may have one or more in-ear monitors 152 that have a housing 154 disposed within the external auditory meatus 156 of an ear 158. While the in-ear monitor 152 can be configured to engage various parts of the ear 158, such as the helix 160, antihelix 162, and lobe 164, the position of the housing 154 in the external auditory meatus 156 can position an audio driver in close proximity to the ear canal and ear drum of the user, which allows for efficient sound isolation and audio reproduction.

Positioning the housing 154 to contact the tragus 166 and antitragus 168 of the ear 158 secures the in-ear monitor 152 and allows sensors and an accelerometer to accurately detect vibration and movement with precise sensitivity. Although the housing 154 may be secure within the external auditory meatus 156, an electrical wire or fitment feature 170, such as a flexible protrusion, can engage a connection point 172 of the helix 160 and skull. In the event an electrical wire 170 is present, contact with the back of the ear 158, between the ear 158 and skull, can further aid in maintaining the housing 154 in place during various activities, such as exercising and sleeping.

It should be noted that while the headphone system 120 of FIG. 2 depicts a wireless headphone 122 and the headphone system 150 of FIG. 3 illustrates a wired in-ear monitor headphone 152, the configurations are not limiting as any of the aspects, components, sizes, and shapes can be utilized by wired and wireless headphones. It should further be noted that the term "sound" within this disclosure hereby is meant as a signal that has an audible or inaudible frequency. Hence, noise, music, speech, and brain waves can each be understood as "sound" that can be detected, processed, and reproduced by one or more headphones.

Figure 4:
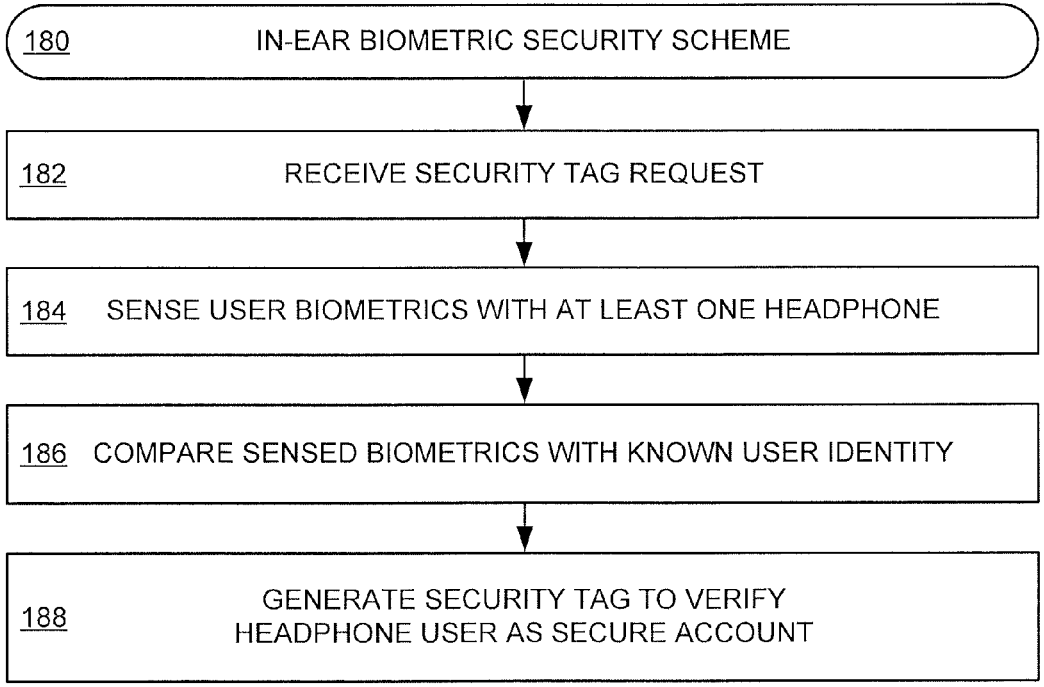
FIG. 4 provides an example in-ear biometric security scheme that may be carried out in in accordance with some embodiments.

The configuration and position of the headphone system 150 can allow for a wide variety of operations and functions that can optimize a user's situation, such as listening to music, sleeping, and securely logging into a remote host. FIG. 4 is a flowchart of an example in-ear biometric security scheme 180 that can be conducted by one or more wired and wireless headphones in accordance with some embodiments. The security scheme 180 can begin by receiving at least one security tag request in step 182. A security tag request is contemplated as a passive or active prompt by a local controller, such as controller 124 of FIG. 2, or by one or more remote hosts, such as host 114 of FIG. 1.

The security tag request may mandate service to allow access and may be continually serviced to maintain a secure connection between a headphone and a host. In a non-limiting example, a user may attempt to access a computer access point while wearing headphones and the headphones, without user prompting, begins routine 180 to establish a secure connection with the host. Various embodiments may complement step 182 with a code entered by the user in the form of interaction with the headphone, such as via talking and gesturing in a predetermined pattern. With such capability, the headphones can allow passwords and encrypted data to be verified without the need for a keyboard or use of the user's hands.

In response to a prompting for a security tag in step 182, step 184 can sense one or more user biometrics with at least one headphone. For the purposes of the current disclosure, the term "biometrics" hereby means any data corresponding to a user, environment around a user, and activity of a user. For example, a biometric may be, but are not limited to, a user's heart beats per minute, sound of a user's heartbeat, vibrations during speech, ear temperature, head movement, and blood pressure. Step 184 may use a single in-ear or over-ear headphone or multiple headphones individually, redundantly, and collectively to detect, measure, and verify a user's biometric. It is contemplated that a headphone may sense one or more user biometrics prior to receiving a security tag request. In such an event, biometrics may be stored locally or remotely to service a subsequent request.

Although not required, the biometrics may be encrypted and processed to generate the security tag, such as with a hash function or cipher. Next, step 186 can compare the sensed user biometrics, either before or after the biometrics are encrypted and processed, with one or more local and remote databases to verify the user's identity. In other words, biometrics attain statically or dynamically can be compared to a database to identify the user as a known identity that has rights and privileges to various capabilities of the headphone and remote hosts. The correlation of the sensed user biometrics from step 184 with a known user identity in step 186 advances routine 180 to step 188 where a security tag is generated by a local or remote controller to verify the headphone wearer as a secure account. Conversely, if step 186 cannot correlate the sensed user biometrics with a known user, the headphones may prompt the user for a password or code, may shutdown, or may pause until further biometrics can be measured and compared to known user identities.

The ability to sense static user biometrics, such as speech vibrations, as well as dynamic user biometrics, such as words spoken per minute, head movement over time, and blood flow vibration, with at least an accelerometer allows a headphone to intelligently grant, or reject, a user access to a remote host by establishing a secure connection without the user having to conduct inefficient identification verification procedures, such as entering a password and answering security questions. It can be appreciated that employing at least an accelerometer in a headphone can provide efficient and secure capabilities to a user through the detection of a user's speech via vibration and/or movement of the user's jaw, skull, teeth, ear, and external auditory meatus.

Figure 5:
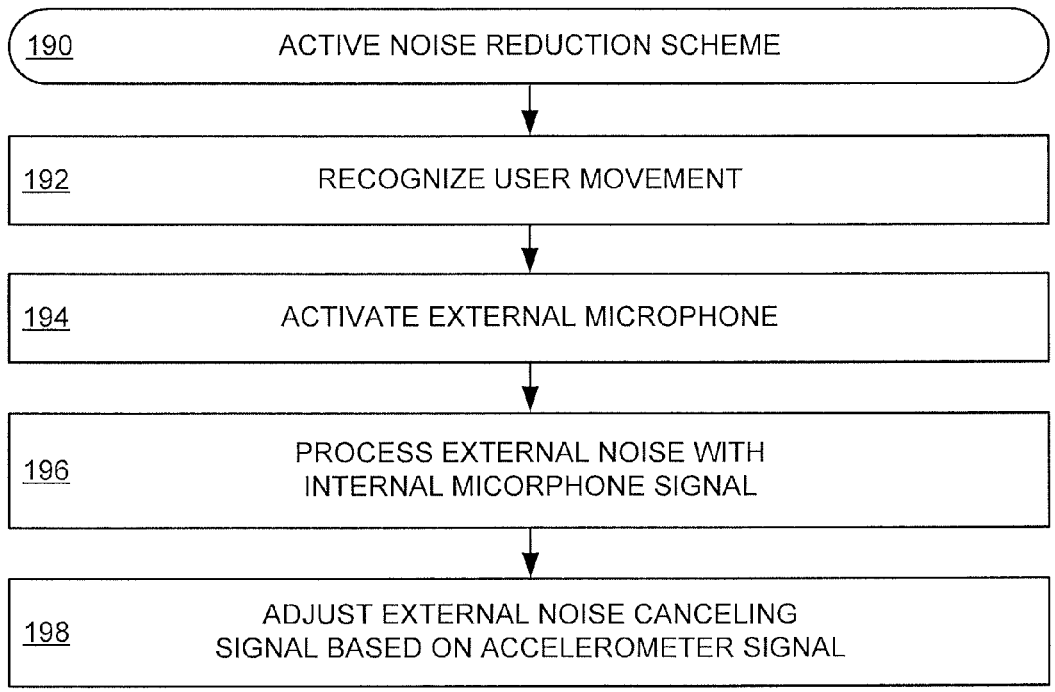
FIG. 5 is an active noise reduction scheme conducted in accordance with various embodiments.

The inclusion of at least an accelerometer into a headphone may provide a variety of other headphone capabilities. FIG. 5 depicts an example active noise reduction scheme 190 that can be carried out by one or more in-ear and over-ear headphones in accordance with assorted embodiments. Some active noise reduction technologies are inherently unstable, particularly during times of frequent or intense activity due, at least in part, to changes in air pressure and air volume that can be difficult to consistently provide a phase cancelling interference for noise external to a headphone.

These difficulties can be addressed by routine 190 that can initially recognize user movement in step 192. The recognition of user movement may alter the headphone from an off, standby, and sleep mode or toggle the execution of active noise reduction operations by a headphone controller. It is contemplated that a headphone is capable of having active noise reduction proactively and reactively toggled by a user and remote host. With the recognition of user movement, such as user speech and exercising, via one or more headphone accelerometers, step 194 may activate an external microphone to capture compression and rarefaction phases of the external noise.

Next, step 196 processes the external noise from step 194 with an internal microphone signal to ensure sound reproduced from the headphone are not cancelled. Normally, active noise reduction would cancel the external noise by emitting an inverted sound wave with the same amplitude as the external noise. However, the volatile pressure and volume of air present during user movement can degrade the characteristics of the external noise and the ability to interfere with the entirety of the noise.

Step 198 utilizes an accelerometer of the headphone to provide biometric and environmental information to the headphone controller so that active noise reduction can more accurately determine the compression and rarefaction phases of the external noise to produce a phase cancelling interference phase. In other words, the accelerometer of the headphone can allow the headphone controller to intelligently detect and cancel external noise based on the amount of air pressure and volume volatility expected for a given user movement. In some embodiments, step 198 uses the accelerometer signal to adjust the external microphone operating parameters, such as sensitivity and gain, so that the external noise is accurately recognized.

Figure 6:
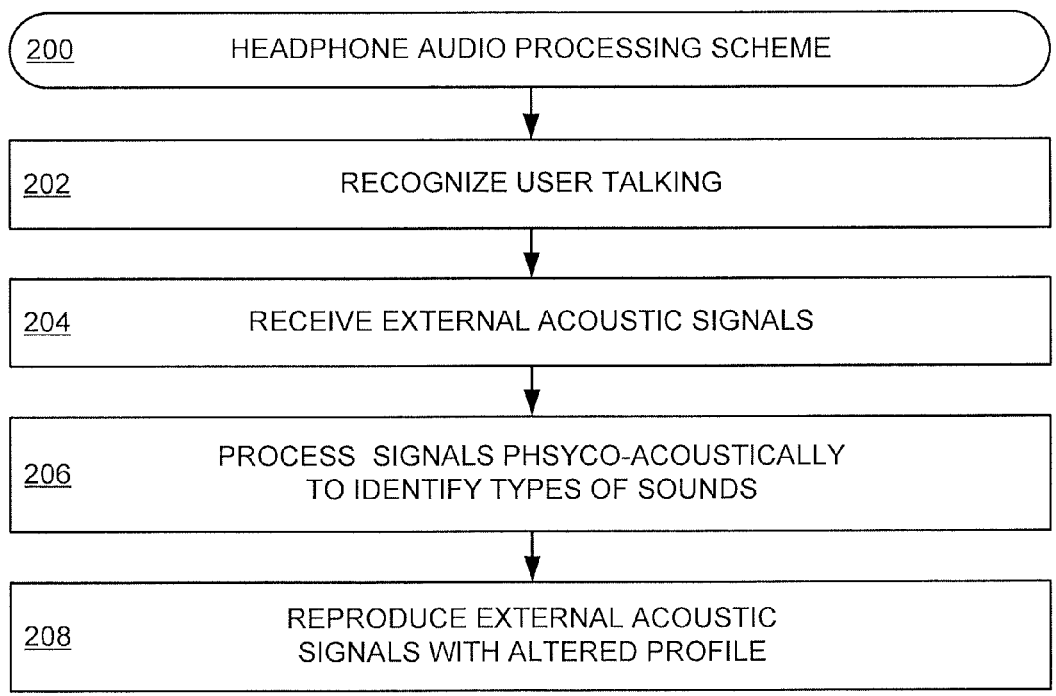
FIG. 6 illustrates an example headphone audio processing scheme that may be carried out in accordance with some embodiments.

The utilization of at least one accelerometer in a headphone may further allow for intelligent audio signal processing. FIG. 6 illustrates an example headphone audio processing scheme 200 that can be carried out by a headphone configured in accordance with various embodiments. Initially, step 202 recognizes a user talking through vibrations and movement detected by a headphone accelerometer.

The accelerometer can be tuned to identify the words, gestures, and loudness of a user's speech by learning a user's repeatable biometrics associated with speech. That is, a headphone controller may conduct a learning routine where a user is prompted to say certain words and depict various gestures that can teach the controller what accelerometer signals are present for assorted spoken words. However, the headphone controller may also be programmed with the capability to recognize a user's spoken word without having to learn user distinct vibrations and movements.

The recognition of a user's words can allow a headphone to tune an external microphone of the headphone to accurately detect speech, music, and environment surrounding the user in step 204. For instance, a user may utilize a whisper when hunting and the headphones would alter the sensitivity and gain of the external microphone to pick up more delicate sounds, such as birds, deer, and other game. In another non-limiting example, the external headphone microphone may be tuned in step 204 to receive acoustic signals in a noisy restaurant with reduced sensitivity and one or more filters.

With the external headphone microphone tuned and receiving external acoustic signals, step 206 may then process the acoustic signals with at least a psycho-acoustic audio processor to differentiate sounds by type. It is contemplated that audio circuitry, such as circuitry utilized in APHEX audio circuitry that can process audio in a psycho-acoustic fashion, is employed in the headphone to intelligently identify sounds. It is to be understood that psycho-acoustic acoustics and processing is hereby meant as the translation of a mechanical sound wave into nerve pulses that travel to a user's brain to be perceived.

It is to be further understood that both a user's ear and brain can be utilized individually, successively, and concurrently to convert waveforms into neural stimuli. Although routine 200 may utilize a variety of diverse audio circuitries that provide psycho-acoustic sound processing, assorted embodiments provide lossy signal compression of sounds and sound optimization that takes into account the anatomy of a user's ear to mask some unwanted frequencies and amplify other frequencies.

Various embodiments can differentiate voices and spoken words from music, noise, and air volume changes with the psycho-acoustic processing in step 206. The identification of sounds by type can allow step 208 to reproduce the external acoustic signals with an altered profile. That is, step 208 can adjust, delay, and cancel portions of the external acoustic signals to optimize clarity, depth, and intensity of sound reproduced by an audio driver of the headphone.

It is contemplated that the audio processing afforded by scheme 200 can allow a headphone to enhance the hearing capabilities of a user. For instance, the external acoustic signal processing and generation of an altered acoustic profile can allow users with and without hearing impairments to clearly listen and converse in noisy environments, such as a festival. Conversely, scheme 200 can alter the acoustic profile of external sound to minimize voices and spoken word while enhancing music clarity and depth, which can be helpful in concerts and performances. The ability for a headphone to tune an external microphone based on speech recognized by a headphone accelerometer can thusly allow for a user to select how external sounds are to be processed and altered, such as greater bass, increased voice clarity, louder music, and increased listening sensitivity.

Figure 7:
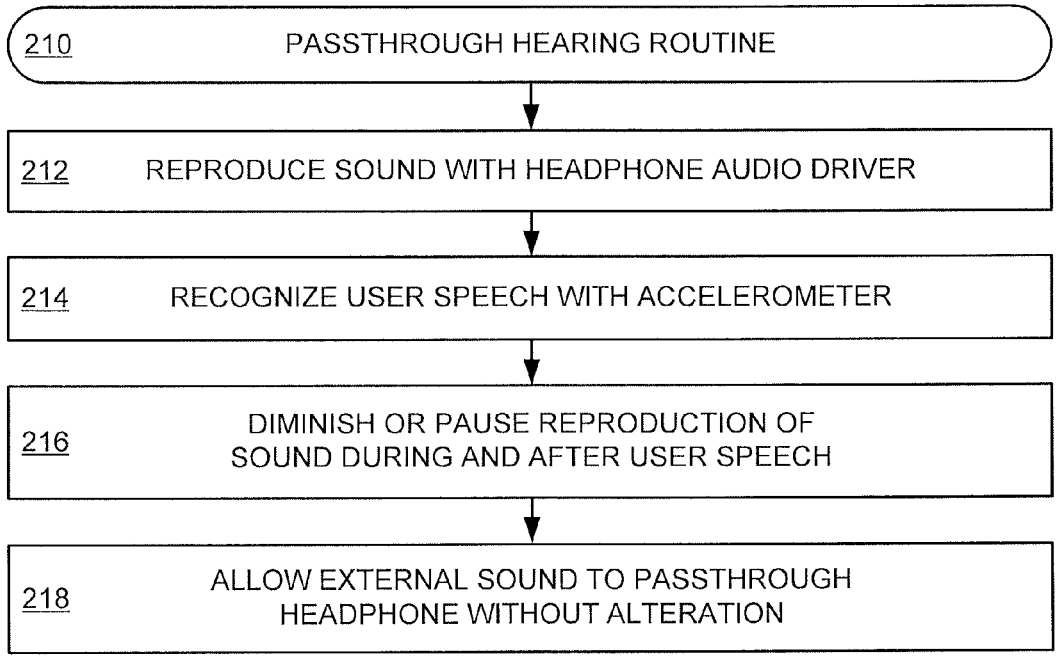
FIG. 7 displays an assisted hearing routine conducted in accordance with various embodiments.

Although altering external acoustic sounds may optimize some user's experience, it is understood that some users and occasions may call for less external sound processing. FIG. 7 is an example passthrough hearing routine 210 that can be conducted automatically and selectively in at least one headphone in accordance with assorted embodiments. The routine 210 can reproduce sound with a headphone audio driver in step 212. Such reproduced sound may be music or silence due to active noise reduction. The production of sound with the audio driver in step 212 can coincide with user speech, which is recognized in step 214 through detection of vibration and movement by at least one headphone accelerometer.

It can be appreciated that while sound is being played through headphones, a user can inadvertently talk louder, faster, and incoherently due to the lack of awareness of the acoustic conditions of the environment. Hence, step 216 can change the acoustic profile of reproduced sound in step 216 in immediate response a user talking. It is contemplated that step 216 can decrease the volume, pause, and remove voices, bass, and abrupt changes in sound intensity to allow the user to speak with more awareness of the acoustic environment around them.

While not required or limiting, various embodiments next allow external sound to passthrough the headphone without alteration in step 218. To clarify, step 218 can reproduce external sounds received from an external microphone or may standby as external sound passes through the headphone with the headphone audio driver reproducing any external sound. The ability to select how external sound passes through the headphone can allow the user to continually wear one or more headphones while engaging in a variety of different conversations. In some embodiments, step 216 maintains an altered reproduction of sound for a predetermined amount of time after the user has spoken, such as 10 seconds, to allow for a seamless, flowing dialog to occur between the user and another.

Figure 8:
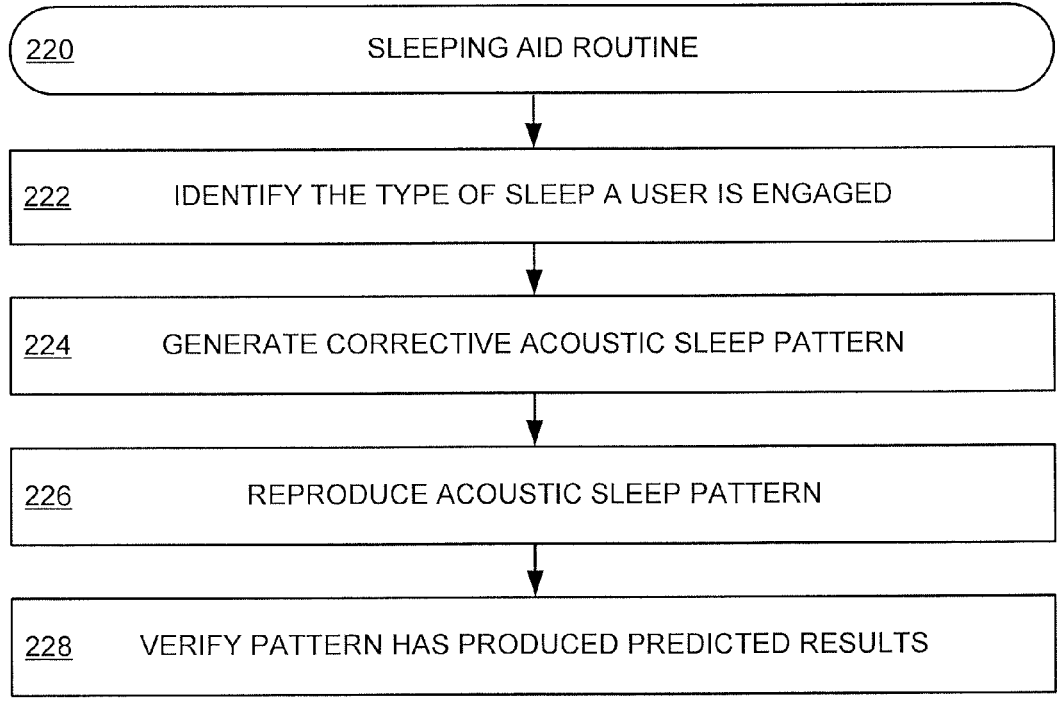
FIG. 8 provides an example intelligent sound processing routine that may be carried out in accordance with assorted embodiments.

FIG. 8 provides a flowchart of an example sleeping aid routine 220 that can be conducted by one or more intelligent headphones employing an accelerometer in accordance with some embodiments. It is contemplated that restful and recuperative sleep can be difficult to attain for many. Sleep may be degraded by external noise, overactive brainwaves, and failure to reach random eye movement (REM) stage of a sleep cycle for enough time. These user struggles have rendered using an accelerometer in a headphone to identify the type of sleep a user is engaged in step 222, generating a corrective acoustic pattern in step 224, reproducing the acoustic pattern in step 226, and verifying user compliance with predicted results in step 228.

In step 222, the accelerometer, along with other headphone sensors, can identify a user's sleep condition by comparing vibration and movement patterns with learned and known sleeping conditions. Much like recognition of speech, a headphone controller may learn unique sleeping parameters over time by logging sleeping parameters and converging those patterns with known sleeping conditions. For example, snoring, teeth grinding, and excessive head movement may individually and collectively identify one or more sleeping conditions.

In the event the sleeping condition is not desired, such as when a condition is out of phase with an ideal sleep cycle, step 224 can generate a corrective sleep pattern relative to the user's preferences. For instance, snoring may be undesired and step 224 generates a corrective acoustic sleep pattern that is known to induce the user to roll over, change neck position, or breath through the nose can be reproduced by the headphone audio driver in step 226 without waking the user. Such sleep patterns can be developed over time by the headphone controller, accessed from a remote third-party, and conducted randomly to evaluate effectiveness.

It is contemplated that inaudible sound frequencies can be utilized in a sleep pattern reproduced in step 226. After step 226 reproduces the corrective acoustic sleep pattern for a predetermined amount of time with uniform or varying intensity, step 228 can conduct one or more measurements to verify the acoustic pattern has produced predicted results. For example, step 228 may activate an external microphone to support the accelerometer in detecting various users biometrics, such as breathing rate, blood flow, jaw position, and head position, to verify steps 224 and 226 were successful. In the event step 228 cannot verify predicted results, some or all of routine 220 may be revisited individually and sequentially to optimize a user's sleep condition. Some embodiments may configure routine 220 to attempt only a certain number of corrective sleep patterns before standing by, which can minimize and prevent inadvertent and unwanted sleeping occurrences as a result of the reproduction of corrective acoustic sleep patterns, such as bad or weird dreams.

It should be noted that the various aspects of the schemes and routines in FIGS. 4-8 are merely illustrative and by no way limit the scope of capabilities of a headphone intelligently employing an accelerometer. As such, any of the steps in FIGS. 4-8 can be moved, changed, and omitted, at will. Likewise, additional steps and decisions can be implemented without limitation. For example routine 220 may incorporate a decision that evaluates and determines if the headphone system is to power down, standby, or remain active during various phases of a user's sleep cycle.

Through the configuration of a headphone with an accelerometer, a user's hearing experience can be optimized. The ability to detect and recognize a user's speech can allow headphone processing to alter external and internal sounds to provide enhanced listening and conversation. The utilization of the headphone accelerometer to measure user biometrics may further allow the headphone system to passively and actively establish and maintain a secure connection with a remote host by verifying a user's identity.

A user's hearing profile may be ascertained through external testing or via internal testing protocol, such as those used in the hearing health community. For instance, testing may be a series of test tones that are calibrated to the intelligent headphone device and are played to the user in anticipation of user input to identify what the user's hearing capabilities are. Such testing can render a hearing loss profile that an intelligent headphone device can be tuned to optimize what the user hears, what sounds are masked, and what sounds are amplified, via onboard computer processing means. For example, phone calls, what a user hears in an environment, listening to live music, listening to recorded music, understanding speech, and articulating speech can each be optimized through sound processing, such as equalization, psycho-acoustic analysis, and compression, in an intelligent headphone An intelligent headphone, and its many features, can be utilized to affectively pair, or otherwise join, one or more intelligent headphones, to form a secure communications network. A secure communications network can allow users to communicate in noisy and covert environments within the limits of wireless technology being utilized. Such a secure communications network can be employed in a virtually unlimited variety of environments and groups of people communicating wirelessly, such as groups of bicyclists, motorcyclists, and video garners. The utilization of sound optimization via an intelligent headphone can allow ambient noises and pass through audio control that optimizes conversation efficiency and performance.

The tuned utilization of one or more accelerometers by an intelligent headphone can allow speech to be recognized and discerned to differentiate between a user's speech to others and a user's personal mumblings. That is, at least one accelerometer can allow an intelligent headphone to identify when a user is projecting speech and transmit such speech across a communication network or identify when a user is talking to themselves and maintaining deactivated network transmission. Such speech recognition can activate voice transmission at appropriate times, which can save battery power.

It is contemplated that at least one automated processing feature can be employed in an intelligent headphone to adjust pass through audio and invoke active noise reduction as well as join, rejoin, and terminate wireless connections with one or more contacts in a secured or unsecured group. Automated processing can utilize one or more sensors to allow audio adjustments to be made automatically to establish and maintain optimized sound reproduction when audio environments and conditions change.

Due to the intelligent nature of a headphone tuned in accordance with various embodiments, a security encryption method can be employed. Security encryption may be based on one or more biometric parameters from the user, which makes the encryption unique to the user. The heightened security provided by encrypted headphone access and use can allow communications to be more secure within a group, such as for military and law enforcement applications. Secure communications may also be utilized by musicians, such as a musical group performing live, to allow select communication to other members of a band, producers, and security personnel.

Assorted embodiments utilize at least one wireless feature of an intelligent headphone to provide zero to low processing and transmission latency of capabilities from remote hosts. For example, intelligent active noise reduction, digital pass through audio, hearing profile adjustment, pairing with production personnel can be conducted without the intelligent headphone locally storing or executing the software associated with the various capabilities. Additionally, various intelligent aspects of a headphone, such as an in-ear monitor, can be utilized to interconnect a local accelerometer and other biometric sensors as a MIDI input device, which enables triggering, playing, and otherwise manipulating of a MIDI capable musical instrument in wired and wireless configurations.

In some embodiments, an intelligent headphone can produce tones that establish and maintain predetermined levels of user alertness. For instance, the intelligent headphone can be configured to detect a level of user alertness and respond by emitting an audible or inaudible tone to alter user alertness. In other embodiments, one or more accelerometers in an intelligent headphone employs biometric user monitoring functions, such as head position and breathing patterns, to detect when a user is in a compromising position, such as asleep while driving, and respond by emitting sound that alters the user's physical and mental condition. It can be appreciated that such capabilities can be useful for a wide variety of commercial and non-commercial driving environments.

An intelligent headphone can be configured with touch and tactile functions on at least one exterior surface that can be utilized with secured wireless connection functionality to allow authorities, such as fire and police departments, to utilize high power radios in combination with the intelligent headphone. That is, an intelligent headphone can be configured to pair to a high power radio and provide external add-on capabilities via a secure network connection, such as a Bluetooth connection. Pairing of an intelligent headphone with a high power radio may further allow external controls, like push-to-talk, to be utilized by the radio.

It is contemplated that an intelligent headphone may be configured to synchronize with a video game to provide surround sound, in-game communications, and an optimized gaming experience. As a non-limiting embodiment, an intelligent headphone can respond to in-game actions, such as the death of a player, with deactivated communications and sounds that inhibit player from communicating.

What is claimed is:

1. An apparatus comprising a headphone configured to engage an ear of a user, the headphone comprising a controller connected to an accelerometer and an audio processor, the audio processor connected to an audio driver configured to generate sound from electrical signals provided by the audio processor, the headphone accelerometer positioned to sense speech of the user via vibrations transferred through the user's ear, the controller configured to alter the generated sound in response to the sensed speech.

2. The apparatus of claim 1, wherein at least one sensor on the headphone is connected to the controller, the at least one sensor adapted to detect biometrics of the user via the contact with the user's ear.

3. The apparatus of claim 2, wherein the controller is adapted to verify an identity of the user based on a profile stored in a local memory by comparing a detected biometric with the profile.

4. The apparatus of claim 2, wherein the detected biometric is at least one of a number of: heart beats of the user per minute, vibrations during speech of the user, vibrations of a heart of the user, temperature of the user's ear, movement of a head of the user, and blood pressure of the user.

5. The apparatus of claim 1, wherein the headphone comprises first and second microphones, the first microphone positioned to detect sound external to the user's ear and the second microphone positioned to detect movement in a mandible of the user.

6. The apparatus of claim 5, wherein the controller selectively activates the first microphone in response to sensed speech.

7. The apparatus of claim 1, wherein the headphone is wirelessly connected to at least one remote host.

8. The apparatus of claim 1, wherein the headphone comprises at least one battery.

9. A method comprising:
engaging a headphone with an ear of a user, the headphone comprising a controller connected to an accelerometer and an audio processor, the audio processor connected to an audio driver configured to generate sound from electrical signals provided by the audio processor;
sensing speech of the user with the accelerometer via vibrations transferred through the user's ear; and
altering the generated sound with the controller in response to the sensed speech.

10. The method of claim 9, wherein the controller psychoacoustically identifies a type of sound in response to the vibrations in the user's ear corresponding to the sensed speech.

11. The method of claim 9, wherein the controller compensates an active noise cancelling signal in response to vibrations or movement of the user sensed by the accelerometer.

12. The method of claim 11, wherein the controller captures compression and rarefaction phases of noise external to the headphone with a microphone in response to vibrations or movement of the user to actively reduce noise external to the headphone.

13. The method of claim 12, wherein the controller compensates the noise cancelling signal by adjusting the sensitivity and gain of the microphone to produce a phase cancelling interference phase.

14. The method of claim 9, wherein the audio processor amplifies at least one acoustic signal external to the headphone in response to the sensed speech.

15. A method comprising:
engaging a headphone with an ear of a user, the headphone comprising a controller connected to an accelerometer and an audio processor, the audio processor connected to an audio driver configured to generate sound from electrical signals provided by the audio processor;
sensing speech of the user with the accelerometer by detecting vibrations and movement of a first mandible of the user;
adjusting an external microphone connected to the controller in response to the detected movement;
receiving external acoustic signals with the external microphone;
differentiating first and second types of sound in the received external acoustic signals with the controller;
altering the external acoustic signals with the controller to amplify the first type of sound and adjust the second type of sound; and
reproducing the altered external acoustic signals with the audio driver as directed by the controller.

16. The method of claim 15, wherein the sensitivity and gain of the external microphone are altered in the adjusting step.

17. The method of claim 15, wherein a filter is employed by the external microphone in the adjusting step.

18. The method of claim 15, wherein the second type of sound is adjusted by being delayed.

19. The method of claim 15, wherein the second type of sound is adjusted by being cancelled.

20. The method of claim 15, wherein the external audio signals are altered to account for an anatomy of the user's ear.

* * * * *